INVENTOR.
RUSSELL DALE PARR,
BY
ATTORNEYS.

continued …

United States Patent Office 3,296,047
Patented Jan. 3, 1967

3,296,047
METHOD OF PRODUCING REINFORCED FLEXIBLE HOSE
Russell Dale Parr, Carlisle, Pa., assignor to Carlisle Tire and Rubber Division of Carlisle Corporation, a corporation of Delaware
Original application May 25, 1962, Ser. No. 198,692, now Patent No. 3,189,053, dated June 15, 1965. Divided and this application Sept. 10, 1964, Ser. No. 395,453
3 Claims. (Cl. 156—86)

The present invention relates to flexible hose and is more particularly concerned with an improvement in methods for producing the same.

The present application is a divisional application from applicant's co-pending application Serial No. 198,692, filed May 25, 1962, now Patent No. 3,189,053, issued June 15, 1965.

The principal object of the present invention is to provide a non-collapsible flexible hose suitable for conveying liquids such as water, chemicals and the like under pressure or not as desired without blowing out or collapsing and which hose has a smooth bore wall and forms arcs of curves when flexed which provides a minimum of resistance to the flow of liquids therethrough.

A further and important object of the invention is to provide an economically produceable wire reinforced hose containing continuous wire coils up to the ends of the hose and which hose can be readily cut into desired lengths thereof for any specific application with the wire reinforcement extending up to the ends of the severed lengths of hose.

Another and equally important object of the invention is to provide a wire reinforced hose that can be quickly and easily produced in long lengths of the same internal and external diameter and which can be readily modified in construction to produce hoses of various degrees of flexibility, resistance to internal pressures and resistance to collapsing.

A still further important object of the invention is to provide a novel and economical method for the manufacture of such wire reinforced flexible hose.

Further objects of the invention will be in part obvious and in part pointed out in the following description of the accompanying drawings, in which.

Figure 1:
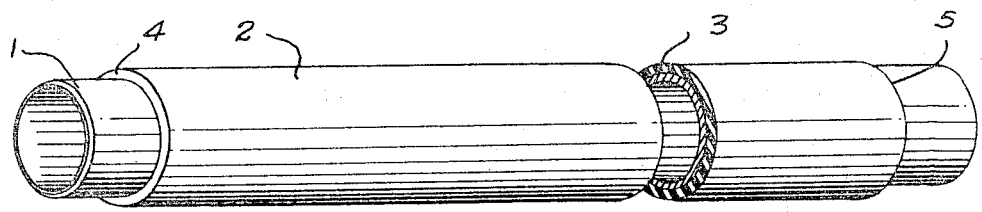
FIG. 1 is a perspective view of a mandrel with the base tube of the present hose thereon in an initial step in the production of the hose.
Figure 2:
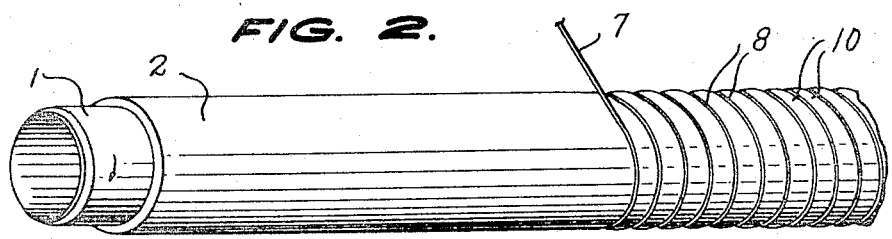
FIG. 2 is a similar perspective view, but showing the encircling of the wire reinforcement on the base tube in a further step in the production of the hose.
Figure 3:
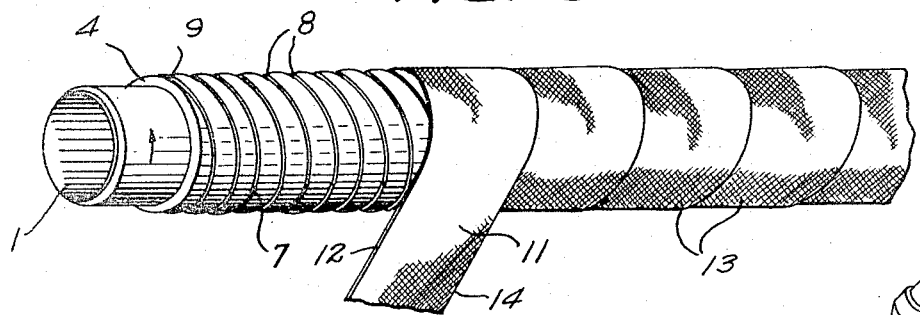
FIG. 3 is also a perspective view similar to FIG. 1, but showing the completion of the encirclement of wire reinforcement on the base tube and the wrapping of a tape over said wire reinforcement.
Figure 4:
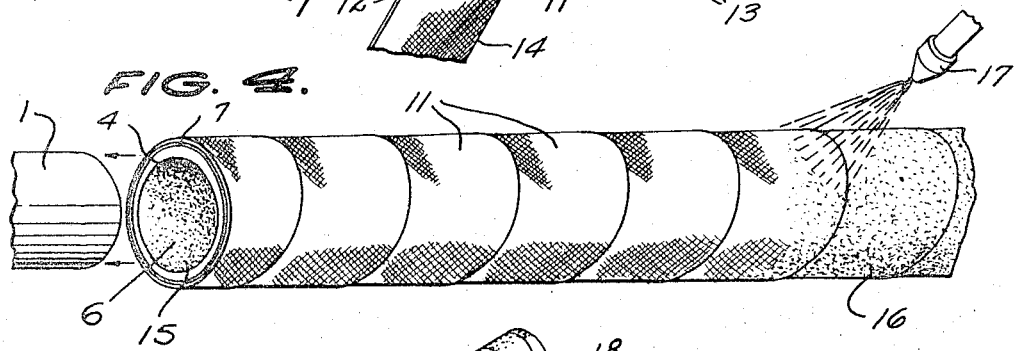
FIG. 4 is a perspective view of the present hose while being coated and the withdrawal of the mandrel.
Figure 5:
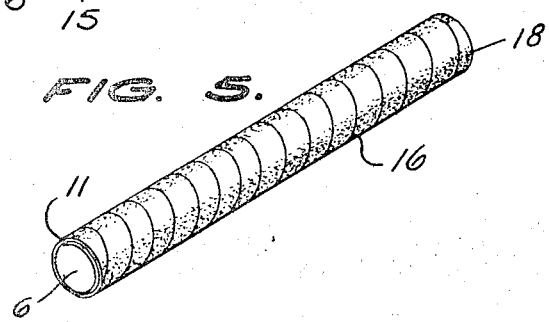
FIG. 5 is a perspective view, reduced size, of the completed hose.

Referring now more particularly to the accompanying drawing wherein like and corresponding parts are designated by similar reference characters, numeral 1 indicates a mandrel suitable for being mounted upon means for rotating the same such as a conventional lathe (not shown) for being rotated thereby or upon clamping means such as a vise (not shown) for being held stationary. The outside diameter of the mandrel determines the inside diameter of the present hose and is accordingly chosen for this purpose.

A tube 2 of an elastomer that will vulcanize such as, for example, synthetic rubbers known in the trade as butyl, neoprene, Hycar, or styrene-butadiene provides the base tube of the hose. The radial thickness of the tube can be varied depending upon the end use of the hose and the length of the hose between ends 4 and 5 also can be varied so that the entire hose can be used in one application or severed into desired lengths thereof with each length to be used for a separate purpose. Said tube further has a smooth walled bore 6 extending the length thereof with mandrel extending therethrough with the diameter of said bore being substantially the same as the peripheral diameter of said mandrel whereupon said tube will rotate or remain fixed with said mandrel during the production of the hose.

A non-collapsible reinforcing filament such as a metallic wire 7 preferably of a spring steel is wound upon base tube 1 in helical convolutions 8 from end 5 to end 4 or vice versa of said tube. Said wire may be wound either upon the peripheral surface of said tube so that the inner diameter of the wire coil is the same as the periphery of the tube or said wire wound under tension so that said wire may be slightly embedded into said tube with the inner coil diameter being slightly less than the periphery of said tube resulting in slightly bulged peripheral portions 10 of said tube between the turns of said wire. The winding of wire 7 on said tube can be effected by rotating mandrel 1 and feeding wire 7 to the rotating tube while holding the initial turn of the wire fixed, or mandrel 1 can be held fixed and wire 7 fed from a head (not shown) rotating around and moving along the length of said tube or by inserting tube 1 into a coil of said wire and drawing the coil ends away from one another. The proper amount of tension is applied to said wire when being applied to form the finished coil thereof with a diameter corresponding to that of the finished hose as desired. The convolutions of said wire can be varied as to the spacings therebetween depending upon the flexibility or stiffness in the finished hose desired.

A tape 11 of either cord or square woven fabric containing cords of or including nylon or synthetic polyester fibers of dimethyl terephthalate and ethylene glycol sold under the trademark Dacron by the E. I. du Pont de Nemours and Co., Inc., of Wilmington, Delaware, and referred hereinafter as Dacron, is wrapped around and over said wire convolutions 8 with edges 12 of said tape abutting or slightly overlapping with each turn providing helical convolutions of said tape wound in the same direction as wire 7, but may be wound in the opposite direction to said wire.

Said tape is coated upon both sides with an elastomer that is compatible with tube 2 for being vulcanized therewith. The construction of the cord or square woven fabric can be varied to give the required strength or degree of stability desired in the hose; and, if square woven fabric is used, it must be cut so that the cords thereof in one direction are continuous or react in a similar manner.

The wrapping of the tape 11 can be effected in the same manner as described for affixing wire 7.

Vulcanizing the assembled tube 2 and tape 11 affixing the same together causes the tape 11 to shrink due to the heat and chemical or physical reaction, occurring during vulcanization supplying an integrated pressure sufficient to bring the layers of tapes 11 into a composite union with tube 2 such that they will vulcanize or otherwise fuse with tube 2.

If it is desired to adhere wire 7 to said tube and tape, it is necessary to clean the wire with an acid and in some instances to coat the same with an elastomer compatible with said tube prior to assembly. For example, if tube 2 is neoprene the wire can be coated with a cement or adhesive for the neoprene. However, adhesion of the wire to tube and tape is not essential.

After vulcanization or heat forming of the hose, a coating 16 of a synthetic elastomer, or a solution of vinyl dissolved in methethyl keton sold under the trademark Korolac, by the B. F. Goodrich Rubber Company of Akron, Ohio, or other material that will adhere to the hose is applied, for example, by a nozzle 17 to the outside and a coating 15 to the bore wall of the hose to increase resistance to oil and grease and improve the appearance of the hose after withdrawal of mandrel 1.

Tube 2 may consist of a thermoplastic material such as polyethylene, vinyl, vinylidene chloride copolymers sold under the trade name Saran or the like, for example in lieu of an elastomer. Likewise, tape 11 may be formed of a non-shrinking cord or fabric. After assembly of tube 2, wire 7 and tape 11 of the non-shrinking material, a wet wrap such as cotton goods soaked in water is applied over the mounted tape and heat applied whereupon a shrinking of the wet wrap compresses the layers of the hose until set whereupon the wrap is removed. However, the use of nylon or Dacron cord fabrics is preferred as the shrinkage continues giving a stronger compression, while the wet wrap only gives a slight shrinkage during the application thereof.

As an example of a method of making hose in accordance with the present invention, a tubular steel mandrel 1 three and a half feet long and one and a half inches in peripheral diameter can be used. A tube 2 of butyl rubber having an inside diameter of one and a half inches and a radial thickness 3 of three-eighths of an inch can have said mandrel inserted in bore 6 and the mandrel mounted on a lathe for being rotated thereby. A wire 7 of one-sixteenth inch thickness is retained at one end adjacent end 5 of tube 2 and fed to the rotating tube so that the wire has three turns per inch along the length of said tube completely up to the end 4 of said tube.

Thereafter a tape 11 of a nylon cord fabric coated on both sides with butyl, said tape being two inches wide and having 18 cords per inch, has one end held fixed adjacent tube end 5 and fed to the rotating tube over wire 7 in the same direction as said wire, so that side 14 slightly overlaps side 12 as the tape is wrapped around said tube and wires for the length of said tube up to end 4.

Thereafter, the assembly of tube 2, wire 7 and tape 11 is subjected to vulcanizing heat, shrinking the nylon cords and vulcanizing tape 11 to tube 2. A coating 16 of Korolac is applied to the exterior of the resulting hose, mandrel 11 is withdrawn therefrom and a similar coating 15 of Korolac is applied to bore wall 6 completing the hose 18.

Whereas one ply of tape 11 has been referred to, additional plies thereof can be applied in like or different directions to said tube to increase the resistance of the hose to internal pressures. Also a tape or tapes 11 having more nylon threads can be used, as for example, four cords per inch with two plies will retain pressure within the hose up to 560 pounds per square inch.

The resulting hose 18 is suitable for use in conveying liquids and semi-liquids therethrough, is water tight, is flexible in that it can be bent in one or a plurality of directions, is non-collapsible due to the support of tape 11 as well as wire 7 and is resistant to the effect of contaminated waters, acids, petroleum products, anti-freezes including glycerin, glycol, alcohol and the like as well as most other liquids.

The invention is capable of modification and such changes thereto as come within the scope of the appended claims is deemed to be a part of the invention.

I claim:
1. A method of producing a reinforced flexible hose consisting in rigidly supporting a tube of heat fusible elastomeric material with a mandrel in the bore thereof, coiling a metal reinforcing filament around the periphery of said tube along the length thereof in spaced apart convolutions leaving portions of said tube periphery exposed therebetween, wrapping a heat shrinkable tape having a heat fusible elastomeric coating over said metal reinforcing filament and tube exposed periphery along the length of said tube, applying fusing heat to said tape and tube and at the same time shrinking said tape against said tube exposed peripheral portions and said metal reinforcing filament bringing said tape into a composite fused union with said tube and said convolutions of said reinforcing filament and removing said tube from said mandrel.

2. In a method for producing a reinforced flexible hose comprising rotating a tube of vulcanizable material, winding a metallic wire about said tube under tension to form helical spaced apart convolutions of said wire imbedded in the periphery of said tube and along the length thereof leaving portions of said tube periphery exposed between said convolutions, applying a vulcanizable coating to at least one side of a tape containing heat shrinkable synthetic cords as a component thereof, thereafter wrapping said coated tape about said tube and helical wire with opposite edges of said tape adjacent one another and subjecting the assembled tube and wrapped tape to heat vulcanization to bond the exposed peripheral portions of said tube to said tape and simultaneously effecting the shrinking of said tape heat shrinkable cords to draw said tape tightly against the assembled wire and tube.

3. A method of producing a reinforced flexible hose consisting in rigidly supporting a thermoplastic tube on a mandrel, coiling a metal wire around said tube along the length thereof in spaced apart convolutions leaving peripheral portions of said tube exposed between said coils, wrapping a fabric tape having a thermoplastic coating thereon around and along the length of said wire and tube to form a hose body, applying a wet wrap to said hose body, subjecting the hose body and wet wrap to heat simultaneously shrinking said wrap, compressing said tape and bonding same to said tube and subsequently removing said wet wrap and mandrel from the resultant hose.

References Cited by the Examiner

UNITED STATES PATENTS

| | | |
|---|---|---|
| 2,406,843 | 9/1946 | Luth et al. |
| 2,674,297 | 4/1954 | Greenwald _____ 156—143 |
| 2,683,466 | 7/1954 | Guiles _____ 156—144 X |
| 2,741,267 | 4/1956 | McKinley _____ 138—133 |
| 2,913,011 | 11/1959 | Noyes et al. _____ 156—144 X |
| 2,988,130 | 6/1961 | Rittenhouse _____ 156—86 |
| 3,015,599 | 1/1962 | Roberts et al. _____ 156—144 |

FOREIGN PATENTS

| | | |
|---|---|---|
| 862,795 | 3/1961 | Great Britain. |

EARL M. BERGERT, *Primary Examiner.*

P. DIER, *Assistant Examiner.*